United States Patent [19]

Nagy-Szakaly

[11] Patent Number: 4,843,982
[45] Date of Patent: Jul. 4, 1989

[54] SEED EMBEDDING IMPLEMENT

[76] Inventor: Joseph Nagy-Szakaly, 5510 W. 93rd St., Los Angeles, Calif. 90045

[21] Appl. No.: 86,855

[22] Filed: Aug. 19, 1987

[51] Int. Cl.⁴ .............................................. A01C 5/02
[52] U.S. Cl. ...................... 111/96; 111/115; 111/89
[58] Field of Search ............... 111/89, 92–98, 111/47.1–7.4, 2

[56] References Cited

U.S. PATENT DOCUMENTS

| 106,568 | 8/1870 | Dyer | 111/96 |
| 193,590 | 7/1877 | Babcock | 111/96 |
| 3,765,347 | 10/1973 | Tormstrom | 111/89 |
| 3,943,863 | 3/1976 | Leonard et al. | 111/89 |
| 4,459,924 | 7/1984 | Hassan et al. | 111/89 |

FOREIGN PATENT DOCUMENTS

| 694803 | 9/1964 | Canada | 111/4 |
| 1117376 | 2/1982 | Canada | 111/89 |
| 548059 | 1/1923 | France | 111/92 |
| 2003011 | 3/1979 | United Kingdom | 111/96 |

Primary Examiner—Danton D. DeMille
Attorney, Agent, or Firm—Henry M. Bissell

[57] ABSTRACT

A device for use in planting seeds and bulbs is disclosed which allows planting in untilled soil with a simple prodding-type motion to both make a hole and to plant the seed in the hole. The device is capable of operation on hills or in almost any other type of terrain, and thus greatly reduces the labor needed to plant seeds and bulbs. It may be used with a conveyor system to continuously supply seed to the device to enable rapid, efficient planting of seed.

17 Claims, 4 Drawing Sheets

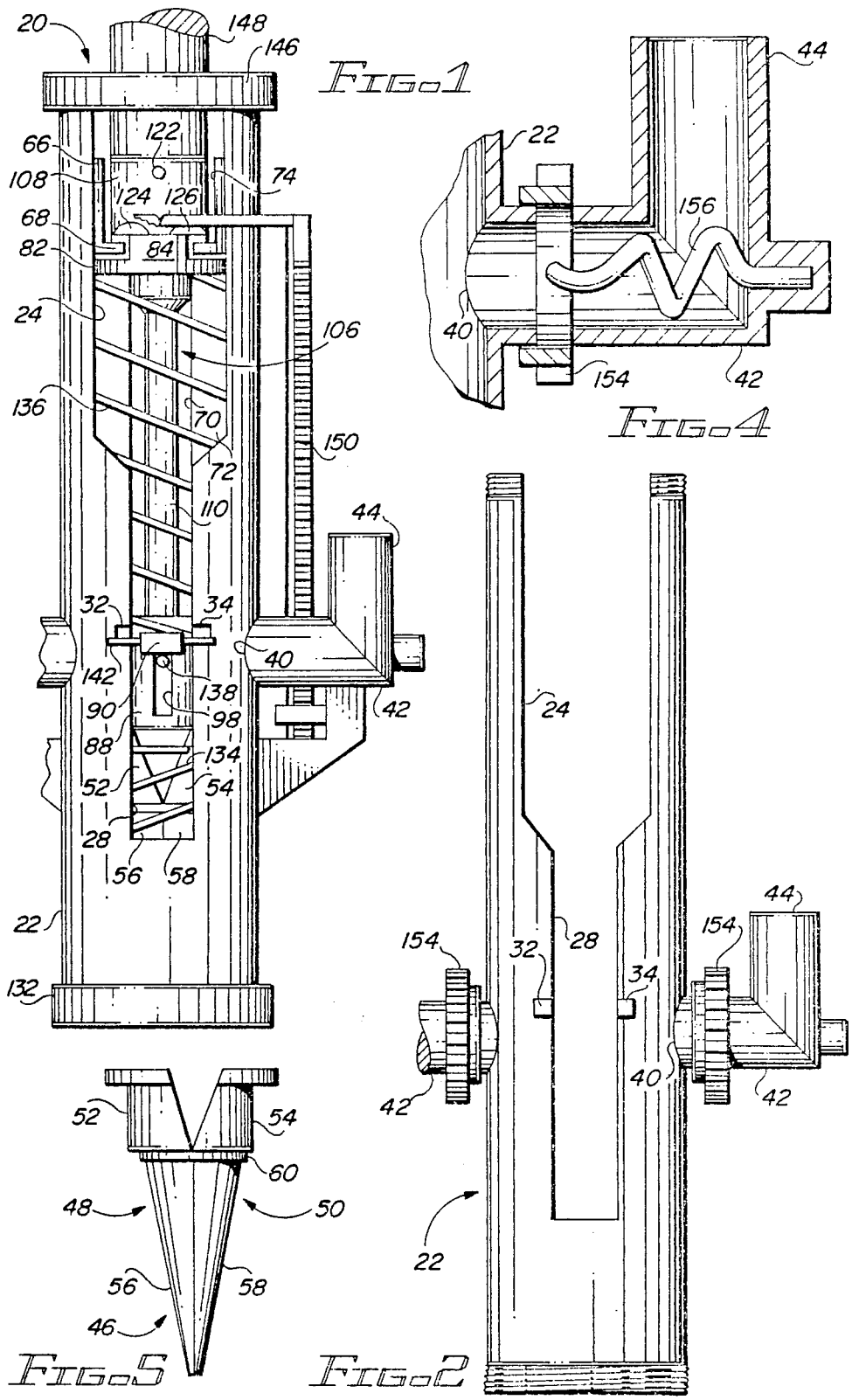

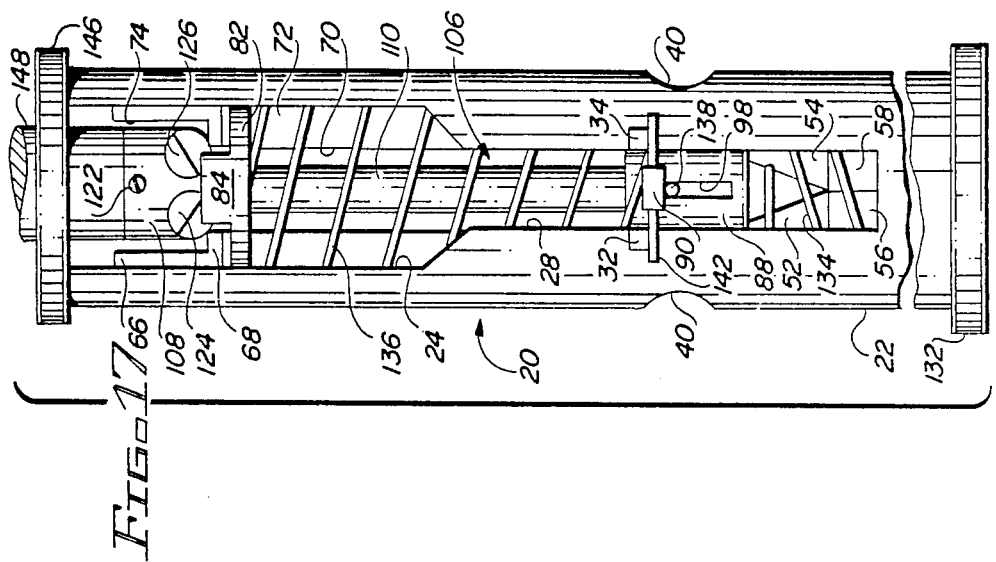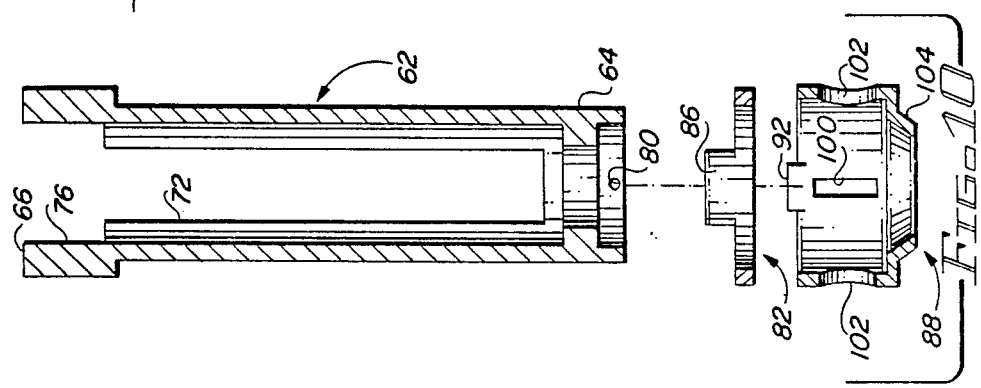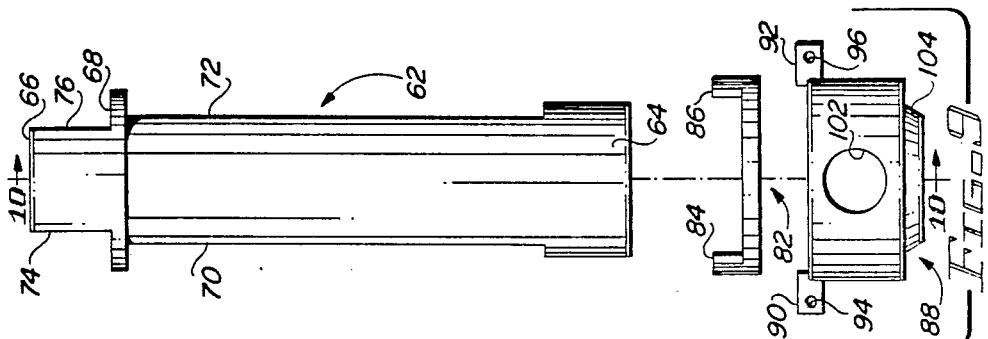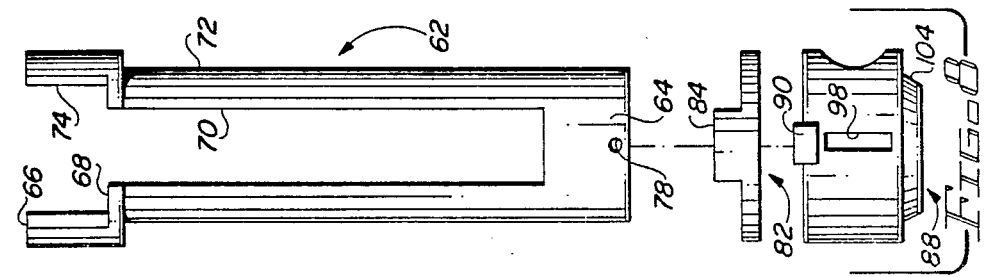

SEED EMBEDDING IMPLEMENT

BACKGROUND OF THE INVENTION

1. Field of the Invention

The present invention relates generally to a device for implanting seeds in soil on any type of terrain with a single downward movement of the device by the operator.

2. Description of the Related Art

As modern farm equipment has developed, the trend has been toward ever-increasing complexity, size, and cost of equipment. This development has tended to concentrate on the areas of farming in which a substantial market for equipment exists. By comparison, the market for simpler, manually operable implements or tools has been relatively modest. In the recent past, such tools have been principally purchased by people who garden as a hobby and, as a consequence, the market for such has been limited.

Available devices for house gardening use all generally operate similarly. A furrow must first be dug, and the device, which typically rolls on one or more wheels, is walked along the furrow and the seeds are dropped, and must then be covered. Such a device does not obviate the need to first till the soil and make a furrow, and then after using the device to close the furrow. This type of device also does not function well on hills, and is limited to gentle slopes. It also will not work with bulbs or large seeds.

It is therefore apparent that a need exists for a device which will operate manually, and which is inexpensive. The device should be operable on any type of terrain, and it must be easy to use. It should not require tilled soil to plant in, but rather should be capable of planting seeds into untilled ground. Finally, it should be usable by individuals or farmers in land which is not amenable to tilling by conventional farming equipment.

SUMMARY OF THE INVENTION

In brief, arrangements in accordance with the present invention comprise a seed planting device which is mounted on the end of a shaft or rod grasped by the user. By firmly poking the end of the device into the soil, the user makes a hole and plants a seed in a single operation. The device preferably includes an automatic feeder, so the user may go along inserting the end of the device into the ground and removing it in a single step, planting each time he performs the step.

The device is operated by placing the bottom of the device against the ground, and pushing downward on an upwardly extending member, preferably including a handle. As the device is pushed downwardly, a small hole is made in the ground and the device ejects a seed into the bottom of the hole. The handle member is then returned to its original extended position by a biasing spring. The device is lifted away from the ground, leaving the implanted seed. The entire operation may then be repeated to plant additional seeds.

The device uses a split inverted, tapered cone resembling a funnel for penetrating the earth. As the handle is pushed downwardly, the tapered cone halves are together, making a hole. When the tapered cone halves are fully inserted into the ground, further downward pressure on the handle causes an implanting piston to force a seed down through the tapered cone halves. The piston forces the tapered cone halves apart, and pushes the seed to the ends of the tapered cone halves. As the device is withdrawn and the seed left behind, the piston withdraws and the tapered cone halves come back together and withdraw into the device.

Although the device has been described to this point as a seed implanting implement, it is to be specifically noted that the term seed as used herein is intended to be generic, referring to bulbs, seeds, or pellets containing seeds and nutrients. The device is most useful for planting larger seeds susceptible to being pushed from the device with the piston. In the preferred embodiment, a conveyor feeding apparatus is used to continuously feed seeds into the device. By so doing, each time the user places the device against the ground and pushes the handle fully downward, a seed will be planted.

It may therefore be appreciated that the device is simple to use and provides a tremendous relative advantage over previously known manual methods. Due to the construction and operation of the device, it may be used on any type of terrain. The device will operate manually, and is relatively easy to use. It does not require tilled soil to plant in, but rather is capable of planting seeds into untilled ground.

DESCRIPTION OF THE DRAWINGS

A better understanding of the present invention may be gained from a consideration of the following detailed description, taken in conjunction with the drawings, in which:

FIG. 1 is a front view of the seed embedding implement of the present invention shown in its resting position with the handle fully upright;

FIG. 2 is a front view of the housing of the device shown in FIG. 1, including the conveyor housing and the feed tube;

FIG. 4 is a view of the conveyor housing and the feed tube cut away to show the spiral conveyor;

FIG. 5 is a front view of the split open assembly of the device of FIG. 1, showing the hinge ring used to allow the split cone halves to open and close;

FIG. 8 is an exploded front view of the drive tube, the balancing ring, and the position stop cylinder of the device shown in FIG. 1;

FIG. 9 is an exploded side view of the drive tube, the balancing ring, and the position stop cylinder shown in FIG. 8;

FIG. 10 is a cutaway exploded view of the drive tube, the balancing ring, and the position stop cylinder shown in FIG. 9;

FIG. 17 is a front view of the device shown in FIG. 1 with the handle returned nearly fully to the upright position, the split cone assembly fully retracted into the housing, and the rotating drive pins being propelled to their resting position by the balancing ring.

DETAILED DESCRIPTION OF THE PREFERRED EMBODIMENT

The preferred embodiment of the present invention is shown in FIG. 1 in its resting position. The various parts making up the embodiment are shown in the various views of FIGS. 2-14. Directions used in this description of the invention and its mode of operation are given relative to the view of FIG. 1, which shows the device from a view defined as the front. The device, indicated generally at 20, is constructed inside and around a cylindrical housing 22. The top and bottom ends of the housing 22 are threaded on the outside.

Figure 3:
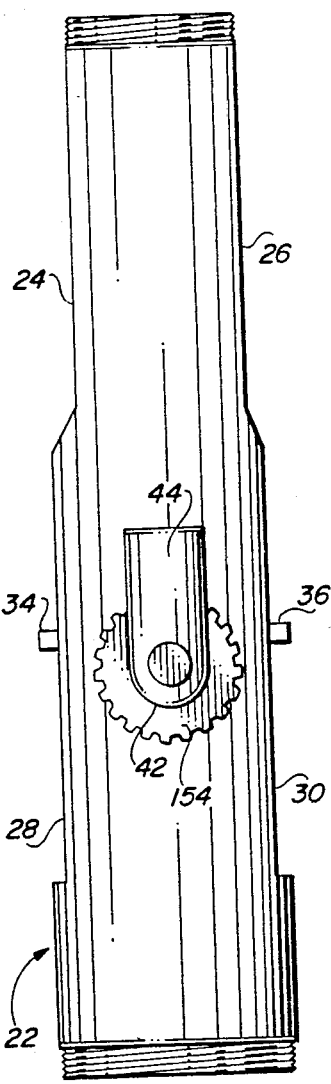
FIG. 3 is a side view of the housing of the device shown in FIG. 2.

The housing 22 is shown from the front in FIG. 2 and from the side in FIG. 3, and it is a hollow cylinder with longitudinal notches cut in the front and the back of the housing 22. A wide notch 24 in the front and another wide notch 26 in the back extend from the top of the housing 22 to a location about 40 percent of the way down the housing 22. From the bottom of the wide notches 24, 26 extend narrower notches 28, 30 respectively, which narrower notches extend to a location about 85 percent of the way down the housing 22.

The areas at which the wide notches 24, 26 meet the narrower notches 28, 30, respectively, are tapered so the width of the wide notches 24, 26 gradually decreases to meet the narrower notches 28, 30, respectively, in these areas. Positioned midway along the narrower notch 28 on the outside of the housing 22 are limit stops 32 and 34, with one of the limit stops 32, 34 on each side of the narrower notch 28. Likewise, positioned midway along the narrower notch 30 on the outside of the housing 22 are limit stops 36 and 38 (not shown), with one of the limit stops 36, 38 on each side of the narrower notch 30.

One side of the housing 22 has a feed aperture 40 therein, which feed aperture 40 is located on the side of the housing 22 just below and between the placement of the limit stops 34 and 36. Extending from the outside of the housing 22 and communicating with the feed aperture 40 is a cylindrical conveyor housing 42, from which extends in a generally upward direction a feed tube 44. Further details of the construction and operation of the conveyor will be discussed later, after the discussion of the construction and operation of the balance of the device 20. A similar aperture and conveyor are indicated as provided on the opposite side of the housing 22 and may be used for injecting fertilizer with an implanted seed.

Figure 6:
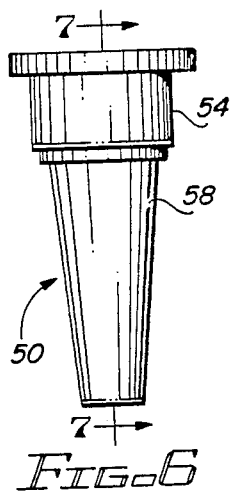
FIG. 6 is a side view of one of the split cone halves of the split cone assembly shown in FIG. 5.
Figure 7:
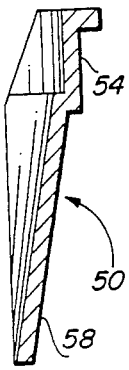
FIG. 7 is a sectional view of the split cone half shown in FIG. 6.

Referring now to FIGS. 5-7, a split cone assembly 46 is shown which is made up of two split cone halves 48 and 50. On the top side of the split cone halves 48, 50 are the split halves 52, 54, respectively, of a flanged cylinder with the flange facing upward. Extending from the bottoms of the split flanged cylinder halves 52, 54 are split tapered segments 56, 58, respectively. The split tapered segments 56, 58 are circular in shape at the top and at the bottoms are wider on the sides (as shown in FIG. 6) than in the front and back (as shown in FIG. 5).

In addition, the split flanged cylinder halves 52, 54 are together at the bottom of the cylinder, but have notches that together form V's in the front and back of the split flanged cylinder halves 52, 54. A hinge means is attached to the split cone halves 48, 50 to allow them to be hingeably connected at the top of the split tapered segments 56, 58 (which is also the bottom of the split flanged cylinder halves 52, 54).

In the preferred embodiment, the hinge means is a spring steel ring 60 extending around the top of the split tapered segments 56, 58, which ring 60 may be soldered or welded to the split cone halves 48, 50 on the sides of the split cone halves 48, 50. The split cone assembly 46 is shown in FIG. 5 in its retracted position, which is how it is located in the view of FIG. 1. It will be appreciated that the ring 60 will allow the split cone halves 48, 50 to move to open or spread apart the bottoms of the split tapered segments 56, 58. It should also be noted that the diameter of the flanged portion of the split flanged cylinder halves 52, 54 is designed to movably fit inside the housing 22 (shown in FIGS. 2 and 3).

Some of the internal mechanical components are shown in FIGS. 8-10 in exploded views. A drive tube 62 is shown which is made of a lower hollow cylinder 64 and a larger diameter upper hollow cylinder 66. The lower end of the upper cylinder 66 is joined to the upper end of the lower cylinder 64 by a shoulder 68 extending therebetween. Notches 70, 72 extend longitudinally in the front and back respectively of the shoulder 68 and the lower cylinder 64 from the top of the lower cylinder 64 to a location about 80 percent down the side of the lower cylinder 64. Wider notches 74, 76 are located longitudinally in the front and back of the upper cylinder 66, and are aligned with the notches 70, 72, respectively.

Completing the drive tube 62 are small holes 78, 80 in the front and rear of the lower cylinder 64 at the bottom and under the notches 70, 72, respectively. The small holes 78, 80 are for receiving pins, as will be discussed later.

Located slidably on the lower cylinder 64 of the drive tube 62 is a balancing ring 82. The balancing ring 82 is ring-shaped and has prongs 84, 86 extending upwardly in the front and back, respectively. The prongs 84, 86 are so arranged and configured as to fit through the portions of the notches 70, 72, respectively, extending through the shoulder 68 of the drive tube 62. When the ring-shaped portion of the balancing ring 82 is adjacent the bottom side of the shoulder 68, the prongs 84, 86 will extend up above the shoulder 68, the prongs 84, 86 will extend up above the shoulder 68 and slightly into the wider notches 74, 76, respectively.

Located below the balancing ring 82 is a position stop cylinder 88, which has ears 90, 92 extending radially outwardly from the top of the position stop cylinder at the front and the back. The ears 90, 92 will extend through the narrower notches 28, 30, respectively, in the housing 22 (FIG. 1). The ears 90, 92 have apertures 94, 96, respectively, therein.

There are also longitudinal positioning notches 98, 100 in the front and back of the position stop cylinder 88 under the ears 90, 92, respectively. Circular apertures 102 are located on opposite sides of the position stop cylinder, and will line up with the feed apertures 40 in the housing 22 (FIG. 1). Finally, on the bottom of the position stop cylinder 88 is a short tapered cylindrical segment 104, which has a decreasing diameter taper in a downwardly direction.

Figure 11:
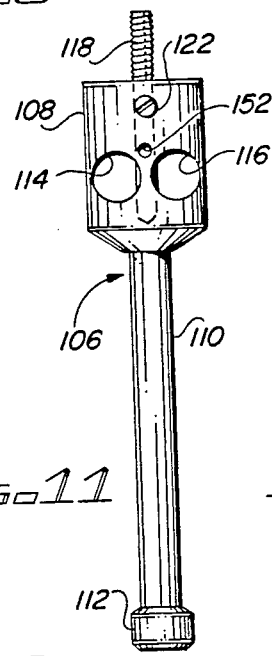
FIG. 11 is a front view of the piston drive assembly of the device shown in FIG. 1.

Referring now to FIG. 11, a piston drive assembly 106 is shown which will fit inside the drive tube 62 (FIGS. 8-10). The piston drive assembly 106 has a larger diameter portion 108 at the top and a tube 110 extending from the bottom of the larger diameter portion 108 and terminating in a piston 112 at the bottom. Two side-by-side parallel cylindrical apertures 114, 116 are bored through the larger diameter portion 108 of the piston drive assembly 106 from the front to the back. The cylindrical apertures 114, 116 each touch one of the sides of the larger diameter portion 108, and are each of a diameter less than one-half of the diameter of the larger diameter portion 108.

A threaded shaft 118 extends from the top of the larger diameter portion 108 and is threaded into a tapped hole in the axis of the larger diameter portion 108. The threaded shaft 118 extends slightly into each of the two cylindrical apertures 114, 116. A set-screw 122 is used to secure the threaded shaft 118 in place.

Figure 12:
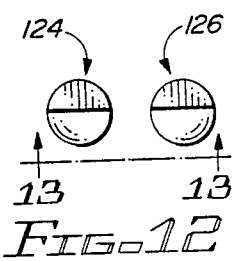
FIG. 12 is an end view of the rotating drive pins as viewed from the front of the device shown in FIG. 1.
Figure 13:
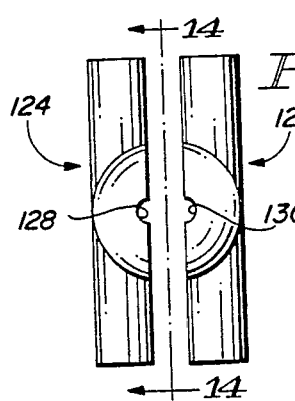
FIG. 13 is a plan view of the rotating drive pins shown in FIG. 12 as viewed from the bottom of the device shown in FIG. 1.
Figure 14:
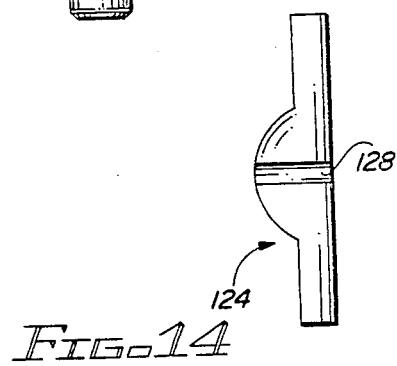
FIG. 14 is a second plan view of the rotating drive pins shown in FIGS. 12 and 13 as viewed from the center of the device shown in FIG. 1.

Two rotating drive pins 124, 126 which fit into the two cylindrical apertures 114, 116, respectively, are shown in FIGS. 12-14. The ends of the rotating drive pins 124, 126 are machined from cylindrical segments to have flat surfaces resembling in cross-section or end view (FIG. 12) chords which are smaller than the diameter of the cylindrical segments. Over half of the cylindrical cross-section at the ends is thus removed. The area between the flat ends on each of the rotating drive pins 124, 126 is machined in a spherical segment shaped approximately like half of a hemisphere.

In the center of each of the rotating drive pins 124, 126 on the inside surface of the half of a hemisphere and the adjoining 90 degree portion of the curved surface of the cylindrical segment making up each of the rotating drive pins 124, 126 is machined a groove 128, 130, respectively. Prior to insertion of the threaded shaft 118 in the tapped hole in the larger cylindrical portion 108 of the piston drive assembly 106 (FIG. 11), the rotating drive pins 124, 126 must be inserted into the cylindrical apertures 114, 116, respectively.

Referring now to FIG. 1 and to FIGS. 8-14 as well, the final assembly of the device 20 may be described. The piston drive assembly 106 is first inserted into the drive tube 62 with the cylindrical apertures 114, 116 of the piston drive assembly 106 extending between the wider notches 74, 76 in the drive tube 62. The rotating drive pins 124, 126 are then inserted into the cylindrical apertures 114, 116, respectively.

The threaded shaft 118 then is screwed into place to retain the rotating drive pins 124, 126 in the cylindrical apertures 114, 116, respectively. The rotating pins 124, 126 will then be able to rotate through a ninety degree rotation. This completes the assembly of the rotating drive pins 124, 126 into the piston drive assembly 106.

The balancing ring 82 is then slidably located on the lower cylinder 64 of the drive tube 62, as previously described with the prongs 84, 86 extending through the notches 70, 72, respectively, in the shoulder 68. An expander spring 136 is then placed on the lower cylinder 64 under the balancing ring 82, and the position stop cylinder 88 is placed on the lower cylinder 64 with the apertures 78, 80 appearing through the positioning notches 98, 100, respectively. Pins 138, 140 (not shown) are then inserted into the apertures 78, 80 through the positioning notches 98, 100, respectively. The pins 138, 140 limit the sliding movement of the position stop cylinder 88 on the lower cylinder 64. The expander spring 136 is thereby located between the balancing ring 82 and the position stop cylinder 88 and under sufficient tension to force the balancing ring 82 upwards against the shoulder 68 and the position stop cylinder 88 downwards with the ears 90, 92 adjacent the pins 138, 140, respectively.

A bottom cap 132 with an aperture therein may then be screwed onto the threaded portion of the bottom of the housing 22 and adjusted for appropriate planting depth. It should be noted that if the ground to be planted is soft, or if it has been tilled, the bottom cap should be included as part of a broader base preventing the housing 22 from sinking into the ground when the device 20 is used. A positioning spring 134 is then dropped from the top into the housing 22, and the split cone assembly 46 (FIG. 5) is inserted bottom first through the positioning spring 134 toward the bottom of the device 20. The positioning spring bears on the bottom cap 132 and on the flange of the split flanged cylinder halves 52, 54, and urges the split cone assembly 46 into the housing 22.

The assembled drive tube 62, piston drive assembly 106 and their assorted components assembled as described above are then dropped into the housing 22 from the top. The bottom of the position stop cylinder 88 bears on the top of the flange of the split flanged cylinder halves 52, 54 of the split cone assembly 46. The ears 90, 92 of the position stop cylinder 88 are pushed below the limit stops 32, 34, 36, 38 (not shown) on the housing 22, and limit pins 142, 144 (not shown) are then inserted into the apertures 94, 96, respectively in the ears 90, 92, respectively.

A top cap 146 having an aperture therein may then be screwed onto the top of the housing 22. Finally, a handle 148 is screwed onto the end of the threaded shaft 118 extending from the top of the larger cylinder portion 108 of the piston drive assembly 106.

The operation of the device 20 as described to this point will not be detailed. In FIG. 1 the device 20 is shown in its rest position. The bottom cap 132 would be placed against the ground, and a seed (not shown) would be placed through the feed aperture 40 into device. The handle 148 would begin to be pushed downwardly, forcing the piston drive assembly 106 downwardly, as shown in moving from the position in FIG. 1 to the position in FIG. 15. The rotating drive pins 124, 126 bear on the shoulder 68, forcing the drive tube 62 down and the pins 138, 140 to the bottoms of the positioning notches 98, 100, respectively. The position stop cylinder 88 then begins to drive the split cone assembly 46 down in to the ground and out of the end of the housing 22 through the bottom cap 132. Up to the point shown in FIG. 15, the piston drive assembly 106 has not moved with respect to the drive tube 62. At this point the position stop cylinder 88 and the split cone assembly 46 cannot move any further in a downward position.

Figure 15:
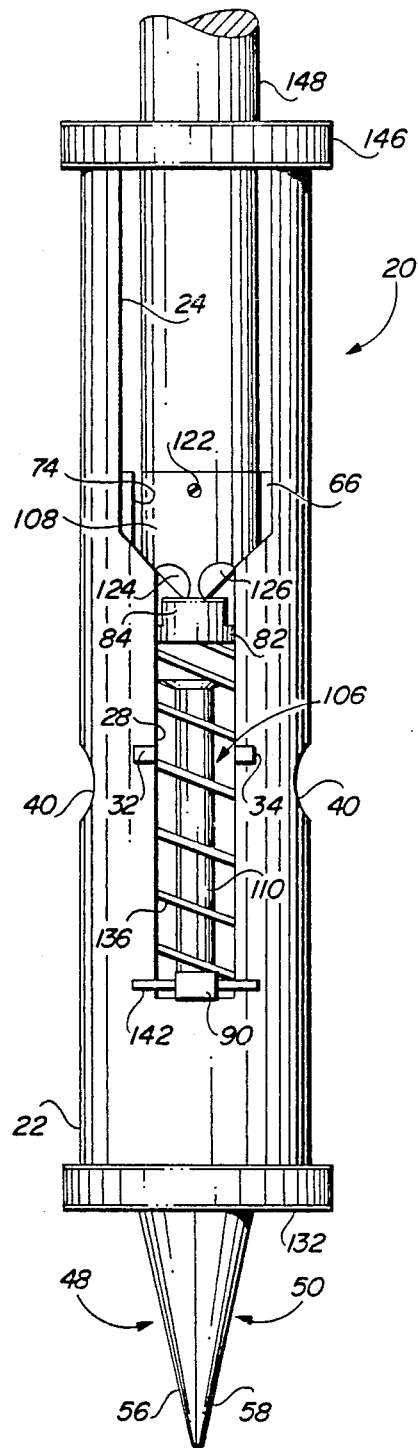
FIG. 15 is a front view of the device shown in FIG. 1 with the handle pushed insufficiently far down to begin to rotate the rotating drive pins and to drive the split cone assembly fully out of the housing.
Figure 16:
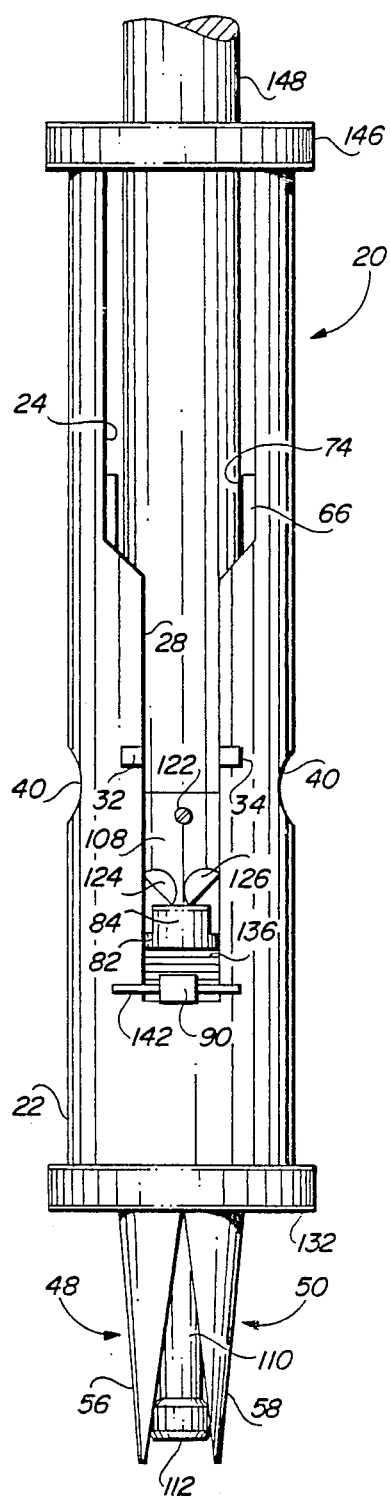
FIG. 16 is a front view of the device shown in FIG. 1 with the handle pushed all the way down to fully open the split cone halves and to drive a seed to the end of the split cone halves.

At the position shown in FIG. 15 the rotating drive pins 124, 126 are beginning to be driven in a rotating fashion by the decreasing width between the wide notches 24, 26 and the narrower notches 28, 30. When the rotating drive pins 124, 126 rotate sufficiently to enter the narrower notches 28, 30, they will also slip into the notches 70, 72 of the drive tube 62, allowing the piston drive assembly 106 to move with respect to the drive tube 62. The piston drive assembly 106 moves to the position shown in FIG. 16, with the piston 112 forcing apart the split cone halves 48, 50 and pushing the seed (not shown) out.

As the handle 148 is released, the various components will return to their original positions as shown in FIG. 1. The rotating drive pins 124, 126, however, must be returned to their original positions. This is done by the prongs 84, 86 of the balancing ring 82, which push on the flattened areas of the rotating drive pins 124, 126 to cause them to rotate back to their original positions, completing the operation.

The construction and operation of a possible conveyor system for the device 20 will now be described with reference to FIGS. 1 and 4. A rack 150 is attached to the piston drive assembly 106, for example, at the location indicated by the reference number 152 in FIG. 11. The rack 150 will therefore move up and down with the piston drive assembly 106. As the rack 150 moves upwardly, it turns a gear 154 which rotates a spiral conveyor 156 to bring a seed (or seeds) through the feed aperture 40. The spiral conveyor is mounted in the conveyor housing 42 (see FIG. 4). A similar arrangement may be provided on the opposite side for injecting fertilizer or the like.

As the rack 150 moves up, a ratcheting mechanism 158 moves it off of the gear 154. The gear 154 therefore turns only in one direction, feeding seeds into the device 20. Such mechanisms are old and are known in the art, and various different types of mechanisms could function equally well.

It may thus be appreciated by those skilled in the art that the device 20 is simple to use and provides a tremendous relative advantage over previously known devices for similar purposes. Due to the construction and operation of the device 20, it is relatively easy to use and is effective in virtually any type of soil and terrain, thereby making it feasible to plant in many places not previously considered tillable. It does not require tilled soil to plant in, but rather is capable of planting seeds into untilled ground. The device operates efficiently and the construction of the device is relatively inexpensive. These advantages are achieved without any relative disadvantage, and the invention therefore represents a desirable improvement over the art.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A device for embedding seeds into soil, comprising:
    a cylindrical housing having a top end and an adjustable bottom end, said bottom end being adapted for placement against said soil for embedding seeds;
    a tapered split cone assembly slidably mounted in said bottom end of said cylindrical housing with the diminishing tapered end of said split cone assembly directed toward said bottom end of said cylindrical housing, said split cone assembly comprising:
    two split cone halves having on the top thereof the split halves of a flanged cylinder with the flange facing upward, with split tapered segments extending from the bottoms of said split flanged cylinder halves, said split tapered segments being circular in shape at the top and at the bottom being wider on the sides than in the front and back adjacent the split between said split cone halves, said split flanged cylinder halves being together at the bottom of the cylinder, but having notches that together form V's in the front and back of said split flanged cylinder halves;
    means for biasing said split cone assembly toward said top end of said cylindrical housing to normally maintain said split cone assembly within said bottom end of said cylindrical housing;
    a drive tube assembly slidably mounted within said cylindrical housing and above said split cone assembly;
    a piston drive assembly slidably mounted within said drive tube assembly, said piston drive assembly having an enlarged cylindrical lower piston, said piston portion having an outer cylindrical surface for contacting the lower portion of the split cone halves, said piston portion located on the end directed toward the bottom end of said drive tube assembly and a cylindrical portion at the top end thereof;
    means for driving said drive tube assembly with said piston drive assembly; and
    a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions.

2. A device as defined in claim 1, further comprising:
    hinge means attached to said split cone halves to allow them to be hingeably connected at the top of said split tapered segments.

3. A device as defined in claim 2, wherein said hinge means comprises:
    a spring steel ring extending around the top of the split tapered segments which ring is soldered or welded to said split cone halves on the sides of said split cone halves, said ring allowing said split cone halves to move to open or spread apart the bottoms of said split tapered segments.

4. A device as defined in claim 1, wherein the diameter of said flanged portion of said split flanged cylinder halves is designed to slidably fit inside said cylindrical housing 22.

5. A device for embedding seeds into soil, comprising:
    a cylindrical housing a top end and an adjustable bottom end, said bottom end being adapted for placement against said soil for embedding seeds;
    a tapered split cone assembly slidably mounted in said bottom end of said cylindrical housing with the diminishing tapered end of said split cone assembly directed toward said bottom end of said cylindrical housing;

means for biasing said split cone assembly toward said top end of said cylindrical housing to normally maintain said split cone assembly within said bottom end of said cylindrical housing, said biasing means comprising:
  a positioning spring bearing against the bottom of said cylindrical housing and said split cone assembly to movably bias said split cone assembly upwardly into said cylindrical housing;
a drive tube assembly slidably mounted within said cylindrical housing and above said split cone assembly;
a piston drive assembly slidably mounted within said drive tube assembly, said piston drive assembly having a piston on the end directed toward the bottom end thereof and a cylindrical portion at the top end thereof;
means for driving said drive tube assembly with said piston drive assembly; and
a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions.

6. A device for embedding seeds into soil, comprising:
  a cylindrical housing having a top end and an adjustable bottom end, said bottom end being adapted for placement against said soil for embedding seeds;
  a tapered split cone assembly slidably mounted in said bottom end of said cylindrical housing with the diminishing tapered end of said split cone assembly directed toward said bottom end of said cylindrical housing;
  means for biasing said split cone assembly toward said top end of said cylindrical housing to normally maintain said split cone assembly within said bottom end of said cylindrical housing;
  a drive tube assembly slidably mounted within said cylindrical housing and above said split cone assembly;
  a piston drive assembly slidably mounted within said drive tube assembly, said piston drive assembly having a piston on the end directed toward the bottom end thereof and a cylindrical portion at the top end thereof;
  means for driving said drive tube assembly with said piston drive assembly; and
  a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions;
  wherein said cylindrical housing has notches extending from the top down the front and back sides thereof, said notches having a wider portion at the top of said cylindrical housing, a narrower portion toward the bottom of said cylindrical housing, and an intermediate portion where the notches change in width from said wider portion to said narrower portion, and said drive tube assembly has notches extending from a shoulder at the top of said drive tube down the front and back sides thereof.

7. A device as defined in claim 6, wherein said driving means comprises:
  two parallel cylindrical apertures in said cylindrical portion extending from the front to the back thereof, said cylindrical apertures each being adjacent opposite sides of said cylindrical portion, said cylindrical apertures having a diameter less than half the diameter of said cylindrical portion; and
  two rotating drive pins installed in said cylindrical apertures, said rotating drive pins having ends machined from cylindrical to flat segments with more than half the cylindrical cross-section removed, said flat segments in end view being a chord of the cylindrical cross-section, the flat segments facing the bottom end of said drive tube assembly and bearing in part against said shoulder at the top end of said drive tube assembly, said flat ends of said rotating drive pins bearing down on said shoulder to cause said piston drive assembly to drive said drive tube assembly to drive said split cone assembly out of said bottom end of said cylindrical housing, said flat ends of said rotating drive pins then being rotated by said intermediate portion of said notches in said cylindrical housing to allow said flat ends to slip through said notches in said drive tube assembly thereby allowing said piston of said piston drive assembly downward through said drive tube assembly.

8. A device as defined in claim 7, additionally comprising:
  a threaded tube screwed into a tapped hole on the top side of said cylindrical portion of said piston drive assembly, said tapped hole extending through a portion of both of said cylindrical apertures in said cylindrical portion of said piston drive assembly; and
  groove means in said rotating drive pins for cooperating with said threaded tube to retain said rotating drive pins in said cylindrical apertures in said cylindrical portion of said piston drive assembly.

9. A device as defined in claim 7, additionally comprising:
  means for returning said rotating drive pins to their original positions.

10. A device as defined in claim 9, wherein said returning means comprises:
  a balancing ring slidably mounted on said drive tube assembly below said shoulder, said balancing ring having upwardly extending prongs extending through the portion of said notches in said drive tube assembly in said shoulder;

means for biasing said balancing ring upwardly toward said shoulder, said balancing ring bearing on said flat ends of said rotating drive pins, urging them up above said shoulder and back to their original position.

11. A device as defined in claim 10, additionally comprising: a position stop cylinder mounted for limited slidable movement near the bottom of said drive tube, said position stop cylinder bearing on the top of said split cone assembly.

12. A device as defined in claim 11, wherein said biasing means for biasing said balancing ring comprises:
a spring bearing against said position stop cylinder to its maximum downward position and urging said balancing ring against said collar with said upwardly extending prongs extending through the portion of said notches in said drive tube assembly in said shoulder.

13. A device as defined in claim 11, additionally comprising:
means for limiting the upward movement of said split cone assembly.

14. A device as defined in claim 13, wherein said limiting means comprises:
ears on said position stop cylinder extending outwardly through said narrower notches in said cylindrical housing;
a limit pin extending through an aperture in each of said ears; and
limit stops on said cylindrical housing for contact with said limit pins to limit the upward movement of said position stop cylinder, and hence, the movement of said split cone assembly in an upward direction.

15. A device for embedding seeds into soil, comprising:
a cylindrical housing having a top end and an adjustable bottom end, said bottom end being adapted for placement against said soil for embedding seeds;
a tapered split cone assembly slidably mounted in said bottom end of said cylindrical housing with the diminishing tapered end of said split cone assembly directed toward said bottom end of said cylindrical housing;
means for biasing said split cone assembly toward said top end of said cylindrical housing to normally maintain said split cone assembly within said bottom end of said cylindrical housing;
a drive tube assembly slidably mounted within said cylindrical housing and above said split cone assembly;
a piston drive assembly slidably mounted within said drive tube assembly, said piston drive assembly having a piston on the end directed toward the bottom end thereof and a cylindrical portion at the top end thereof;
means for driving said drive tube assembly with said piston drive assembly;
a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions; and
means for continuously feeding a supply of seeds and nutrient to said device which comprises:
a feed aperture in the side of said cylindrical housing;
a conveyor housing communicating with said feed aperture;
a feed tube communicating with said conveyor housing, said feed tube leading from a source of seeds to said conveyor housing;
a spiral conveyor mounted for rotation in said conveyor housing, said conveyor for impelling seeds supplied from said feed tube through said feed aperture in said cylindrical housing; and
means for driving said spiral conveyor.

16. A device as defined in claim 15, wherein said means for driving said spiral conveyor comprises:
a rack driven in an up and down direction by the movement of said piston drive assembly;
a gear located on said spiral conveyor for allowing said spiral conveyor to be driven by the movement of said rack; and
means for causing said rack to drive said gear in a single direction only.

17. A device for embedding seeds into soil, comprising:
a cylindrical housing having a top end and an adjustable bottom end, said bottom end for placement against said soil for embedding seeds, said cylindrical housing having notches extending from the top down the front and back sides thereof, said notches having a wider portion at the top of said cylindrical housing, a narrower portion toward the bottom of said cylindrical housing, and an intermediate portion where the notches change in width from said wider portion to said narrower portion;
a tapered split cone assembly slidably mounted in said bottom end of said cylindrical housing with the diminishing tapered end of said split cone assembly directed toward said bottom end of said cylindrical housing;
means for biasing said split cone assembly toward said top end of said cylindrical housing to normally maintain said split cone assembly within said bottom end of said cylindrical housing;
a drive tube assembly slidably mounted within said cylindrical housing and above said split cone assembly, said drive tube assembly having notches extending from a shoulder at the top of said drive tube down the front and back sides thereof;
a piston drive assembly slidably mounted within said drive tube assembly, said piston drive assembly having a piston on the end directed toward the bottom end thereof and a cylindrical portion at the top end thereof, said cylindrical portion having two parallel cylindrical apertures therein extending from the front to the back thereof, said cylindrical apertures each being adjacent opposite sides of said cylindrical portion, said cylindrical apertures having a diameter less than half the diameter of said cylindrical portion;
two rotating drive pins installed in said cylindrical apertures, said rotating drive pins having ends machined from cylindrical flat segments with more means for biasing said split cone assembly toward said top end of said cylindrical housing to normally maintain said split cone assembly within said bottom end of said cylindrical housing, said biasing means comprising:
  a positioning spring bearing against the bottom of said cylindrical housing and said split cone assembly to movably bias said split cone assembly upwardly into said cylindrical housing;
a drive tube assembly slidably mounted within said cylindrical housing and above said split cone assembly;
a piston drive assembly slidably mounted within said drive tube assembly, said piston drive assembly having a piston on the end directed toward the bottom end thereof and a cylindrical portion at the top end thereof;
means for driving said drive tube assembly with said piston drive assembly; and
a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions.

6. A device for embedding seeds into soil, comprising:
  a cylindrical housing having a top end and an adjustable bottom end, said bottom end being adapted for placement against said soil for embedding seeds;
  a tapered split cone assembly slidably mounted in said bottom end of said cylindrical housing with the diminishing tapered end of said split cone assembly directed toward said bottom end of said cylindrical housing;
  means for biasing said split cone assembly toward said top end of said cylindrical housing to normally maintain said split cone assembly within said bottom end of said cylindrical housing;
  a drive tube assembly slidably mounted within said cylindrical housing and above said split cone assembly;
  a piston drive assembly slidably mounted within said drive tube assembly, said piston drive assembly having a piston on the end directed toward the bottom end thereof and a cylindrical portion at the top end thereof;
  means for driving said drive tube assembly with said piston drive assembly; and
  a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions;
  wherein said cylindrical housing has notches extending from the top down the front and back sides thereof, said notches having a wider portion at the top of said cylindrical housing, a narrower portion toward the bottom of said cylindrical housing, and an intermediate portion where the notches change in width from said wider portion to said narrower portion, and said drive tube assembly has notches extending from a shoulder at the top of said drive tube down the front and back sides thereof.

7. A device as defined in claim 6, wherein said driving means comprises:
  two parallel cylindrical apertures in said cylindrical portion extending from the front to the back thereof, said cylindrical apertures each being adjacent opposite sides of said cylindrical portion, said cylindrical apertures having a diameter less than half the diameter of said cylindrical portion; and
  two rotating drive pins installed in said cylindrical apertures, said rotating drive pins having ends machined from cylindrical to flat segments with more than half the cylindrical cross-section removed, said flat segments in end view being a chord of the cylindrical cross-section, the flat segments facing the bottom end of said drive tube assembly and bearing in part against said shoulder at the top end of said drive tube assembly, said flat ends of said rotating drive pins bearing down on said shoulder to cause said piston drive assembly to drive said drive tube assembly to drive said split cone assembly out of said bottom end of said cylindrical housing, said flat ends of said rotating drive pins then being rotated by said intermediate portion of said notches in said cylindrical housing to allow said flat ends to slip through said notches in said drive tube assembly thereby allowing said piston of said piston drive assembly downward through said drive tube assembly.

8. A device as defined in claim 7, additionally comprising:
  a threaded tube screwed into a tapped hole on the top side of said cylindrical portion of said piston drive assembly, said tapped hole extending through a portion of both of said cylindrical apertures in said cylindrical portion of said piston drive assembly; and
  groove means in said rotating drive pins for cooperating with said threaded tube to retain said rotating drive pins in said cylindrical apertures in said cylindrical portion of said piston drive assembly.

9. A device as defined in claim 7, additionally comprising:
  means for returning said rotating drive pins to their original positions.

10. A device as defined in claim 9, wherein said returning means comprises:
  a balancing ring slidably mounted on said drive tube assembly below said shoulder, said balancing ring having upwardly extending prongs extending through the portion of said notches in said drive tube assembly in said shoulder;

means for biasing said balancing ring upwardly toward said shoulder, said balancing ring bearing on said flat ends of said rotating drive pins, urging them up above said shoulder and back to their original position.

11. A device as defined in claim 10, additionally comprising: a position stop cylinder mounted for limited slidable movement near the bottom of said drive tube, said position stop cylinder bearing on the top of said split cone assembly.

12. A device as defined in claim 11, wherein said biasing means for biasing said balancing ring comprises:
a spring bearing against said position stop cylinder to its maximum downward position and urging said balancing ring against said collar with said upwardly extending prongs extending through the portion of said notches in said drive tube assembly in said shoulder.

13. A device as defined in claim 11, additionally comprising:
means for limiting the upward movement of said split cone assembly.

14. A device as defined in claim 13, wherein said limiting means comprises:
ears on said position stop cylinder extending outwardly through said narrower notches in said cylindrical housing;
a limit pin extending through an aperture in each of said ears; and
limit stops on said cylindrical housing for contact with said limit pins to limit the upward movement of said position stop cylinder, and hence, the movement of said split cone assembly in an upward direction.

15. A device for embedding seeds into soil, comprising:
a cylindrical housing having a top end and an adjustable bottom end, said bottom end being adapted for placement against said soil for embedding seeds;
a tapered split cone assembly slidably mounted in said bottom end of said cylindrical housing with the diminishing tapered end of said split cone assembly directed toward said bottom end of said cylindrical housing;
means for biasing said split cone assembly toward said top end of said cylindrical housing to normally maintain said split cone assembly within said bottom end of said cylindrical housing;
a drive tube assembly slidably mounted within said cylindrical housing and above said split cone assembly;
a piston drive assembly slidably mounted within said drive tube assembly, said piston drive assembly having a piston on the end directed toward the bottom end thereof and a cylindrical portion at the top end thereof;
means for driving said drive tube assembly with said piston drive assembly;
a handle connected to said piston drive assembly and extending through the top end of said cylindrical housing, said handle when pushed down causing said piston drive assembly to drive said drive tube assembly, which in turn then drives said split cone assembly to extend out of said bottom end of said housing into said soil, said driving means then allowing said piston drive assembly to move downward through said drive tube assembly to cause said piston to extend through said split cone assembly, opening the ends of the split cone assembly and forcing a seed out of said split cone assembly, said handle then being allowed to return to its original position, returning the piston drive assembly, the drive tube assembly, and the split cone assembly to their original positions; and
means for continuously feeding a supply of seeds and nutrient to said device which comprises:
a feed aperture in the side of said cylindrical housing;
a conveyor housing communicating with said feed aperture;
a feed tube communicating with said conveyor housing, said feed tube leading from a source of seeds to said conveyor housing;
a spiral conveyor mounted for rotation in said conveyor housing, said conveyor for impelling seeds supplied from said feed tube through said feed aperture in said cylindrical housing; and
means for driving said spiral conveyor.

16. A device as defined in claim 15, wherein said means for driving said spiral conveyor comprises:
a rack driven in an up and down direction by the movement of said piston drive assembly;
a gear located on said spiral conveyor for allowing said spiral conveyor to be driven by the movement of said rack; and
means for causing said rack to drive said gear in a single direction only.

17. A device for embedding seeds into soil, comprising:
a cylindrical housing having a top end and an adjustable bottom end, said bottom end for placement against said soil for embedding seeds, said cylindrical housing having notches extending from the top down the front and back sides thereof, said notches having a wider portion at the top of said cylindrical housing, a narrower portion toward the bottom of said cylindrical housing, and an intermediate portion where the notches change in width from said wider portion to said narrower portion;
a tapered split cone assembly slidably mounted in said bottom end of said cylindrical housing with the diminishing tapered end of said split cone assembly directed toward said bottom end of said cylindrical housing;
means for biasing said split cone assembly toward said top end of said cylindrical housing to normally maintain said split cone assembly within said bottom end of said cylindrical housing;
a drive tube assembly slidably mounted within said cylindrical housing and above said split cone assembly, said drive tube assembly having notches extending from a shoulder at the top of said drive tube down the front and back sides thereof;
a piston drive assembly slidably mounted within said drive tube assembly, said piston drive assembly having a piston on the end directed toward the bottom end thereof and a cylindrical portion at the top end thereof, said cylindrical portion having two parallel cylindrical apertures therein extending from the front to the back thereof, said cylindrical apertures each being adjacent opposite sides of said cylindrical portion, said cylindrical apertures having a diameter less than half the diameter of said cylindrical portion;
two rotating drive pins installed in said cylindrical apertures, said rotating drive pins having ends machined from cylindrical flat segments with more